United States Patent
Lin et al.

(10) Patent No.: US 11,934,838 B2
(45) Date of Patent: Mar. 19, 2024

(54) STORING EFI VARIABLES IN A BMC USING AN API

(71) Applicant: QUANTA COMPUTER INC., Taoyuan (TW)

(72) Inventors: Yu-Ting Lin, Taoyuan (TW); Yu-Han Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 109 days.

(21) Appl. No.: 17/668,253

(22) Filed: Feb. 9, 2022

(65) Prior Publication Data
US 2023/0251866 A1 Aug. 10, 2023

(51) Int. Cl.
*G06F 9/4401* (2018.01)
*G06F 9/445* (2018.01)
*G06F 9/54* (2006.01)

(52) U.S. Cl.
CPC ........ *G06F 9/4401* (2013.01); *G06F 9/44505* (2013.01); *G06F 9/44521* (2013.01); *G06F 9/547* (2013.01)

(58) Field of Classification Search
CPC ....................................................... G06F 9/04
See application file for complete search history.

(56) References Cited

U.S. PATENT DOCUMENTS

| | | | | |
|---|---|---|---|---|
| 7,472,141 B1 * | 12/2008 | Shah | ................. | G06F 16/122 |
| 2015/0089209 A1 * | 3/2015 | Jacobs | ................. | G06F 21/575 |
| | | | | 713/1 |

(Continued)

FOREIGN PATENT DOCUMENTS

| | | |
|---|---|---|
| CN | 112003826 A | 11/2020 |
| CN | 113010217 A | 6/2021 |

(Continued)

OTHER PUBLICATIONS

TW Office Action for Application No. 111124012, dated Jun. 29, 2023, w/ First Office Action Summary.

(Continued)

*Primary Examiner* — Paul Yen
(74) *Attorney, Agent, or Firm* — NIXON PEABODY LLP

(57) ABSTRACT

A system includes one or more data processors and a non-transitory computer-readable storage medium containing instructions which, when executed on the one or more data processors, cause the one or more data processors to perform operations. The operations include receiving a modified basic input-output system (BIOS) setting using an application programming interface (API). The modified BIOS setting includes an attribute describing at least one extensible firmware interface (EFI) variable. The operations further include storing the modified BIOS setting in a future setting data structure in a baseboard management controller (BMC). The operations further include providing a current setting data structure stored in the BMC. The operations further include replacing at least a portion of the current setting data structure with the modified BIOS setting to provide a modified current setting data structure. The modified current setting data structure is then applied to the system.

20 Claims, 5 Drawing Sheets

(56) References Cited

U.S. PATENT DOCUMENTS

| | | | |
|---|---|---|---|
| 2015/0154092 A1* | 6/2015 | Chen | G06F 9/4401 |
| | | | 713/2 |
| 2019/0050351 A1 | 2/2019 | Sahu et al. | |
| 2019/0095195 A1* | 3/2019 | Lin | G06F 8/654 |
| 2020/0133712 A1 | 4/2020 | Rathineswaran et al. | |

FOREIGN PATENT DOCUMENTS

| | | |
|---|---|---|
| CN | 113064625 A | 7/2021 |
| TW | I627527 B | 6/2018 |
| TW | 202136996 A | 10/2021 |

OTHER PUBLICATIONS

TW Search Report for Application No. 111124012, dated Jun. 29, 2023, w/ First Office Action.

JP Office Action for Application No. 2022-157237, dated Nov. 21, 2023, w/ First Office Action Summary and English translation 9 pp.

* cited by examiner

STORING EFI VARIABLES IN A BMC USING AN API

FIELD OF THE INVENTION

The present invention relates generally to networked computing systems, and more specifically, to configuring networked computing systems using Extensible Firmware Interface (EFI) variables.

BACKGROUND OF THE INVENTION

Computing systems (e.g., servers) are employed in large numbers for high demand applications, such as network-based systems or data centers. The emergence of cloud computing applications has increased the demand for data centers. Data centers have numerous servers that store data and run applications accessed by remotely-connected computer device users. A typical data center has physical rack structures with attendant power and communication connections. Each rack may hold multiple computing servers and storage servers. Each server generally includes hardware components such as processors, memory devices, network interface cards, power supplies, and other specialized hardware. Servers generally include a baseboard management controller (BMC) that manages the operation of hardware components as well as support components such as power supplies and fans. The BMC also communicates operational data to a central management station that manages the servers of the rack through a network. The BMC relieves the need for the Central Processing Unit (CPU) of the server to monitor server operations. Downtime of data centers or computing systems within data centers is a concern. The BMC can be further enhanced to manage booting of the computing systems and not merely monitor the computing systems.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system includes one or more data processors and a non-transitory computer-readable storage medium containing instructions which, when executed on the one or more data processors, cause the one or more data processors to perform operations. The operations include receiving a modified basic input-output system (BIOS) setting using an application programming interface (API). The modified BIOS setting includes an attribute describing at least one Extensible Firmware Interface (EFI) variable. The operations further include storing the modified BIOS setting in a future setting data structure in a baseboard management controller (BMC). The operations further include providing a current setting data structure stored in the BMC. The operations further include replacing at least a portion of the current setting data structure with the modified BIOS setting to provide a modified current setting data structure. The modified current setting data structure is then applied to the system.

In an implementation, the EFI variable describes attributes of an Internet Small Computer System Interface (iSCSI) device, a unified EFI (UEFI) Secure Boot setting, a boot order of bootable devices, TLS certificates, and/or network VLAN settings. In an implementation, executing the instructions further cause the one or more data processors to perform operations includes determining whether the BIOS is performing a first boot, and sending, by the BIOS to the BMC, an attribute registry, based at least in part on the determining that the BIOS is performing the first boot. In an implementation, the attribute registry includes a definition of the attribute describing the at least one EFI variable. In an implementation, a type key of the attribute describing the at least one EFI variable is a string. In an implementation, the definition of the attribute describing the at least one EFI variable does not include a default value and a definition of an attribute describing a general BIOS setting includes a default value.

In an implementation, the API is a Redfish API. In an implementation, the future setting data structure and the current setting data structure are in JavaScript Object Notation (JSON) format. In an implementation, executing the instructions further cause the one or more data processors to perform operations include storing the EFI variable to the current setting data structure. In an implementation, the storing the EFI variable to the current setting data structure includes packing the EFI variable as a binary structure, encoding the binary structure to a string, and storing, in the current setting data structure, the string as a value of the attribute. In an implementation, the storing the EFI variable to the current setting data structure further includes compressing the binary structure prior to encoding the binary structure. In an implementation, the binary structure is encoded using Base64.

In an implementation, replacing at least a portion of a current setting data structure stored in the BMC with the modified BIOS setting from the future setting data structure includes receiving a string from the future setting data structure, the string being a value of the attribute. The string is then decoded to a binary structure. At least a portion of the current setting data structure is replaced with the string in the future setting data structure based on the binary data structure being applicable into the BIOS as an EFI variable. In an implementation, replacing at least a portion of a current setting data structure stored in the BMC with the modified BIOS setting from the future setting data structure further includes decompressing the binary structure after decoding the string. In an implementation, the binary structure is decoded using Base64.

In an implementation, the replacing at least a portion of a current setting data structure with the modified BIOS setting is performed during BIOS power-on self-test (POST). In an implementation, the system is a server. In an implementation, the system is a data center including at least one server. In an implementation, any one of the current setting data structure, the future setting data structure, or an attribute registry is generated from a Unified Extensible Firmware Interface (UEFI) human interface infrastructure (HII) database of the BIOS. In an implementation, the at least one server includes a first server and a second server, and executing the instruction further cause the one or more data processors to perform operations includes porting a current setting data structure of the first server and an associated attribute registry of the first server to the second server.

According to certain aspects of the present disclosure, a method performed by a computing system includes receiving a modified basic input-output system (BIOS) setting using an application programming interface (API). The modified BIOS setting includes an attribute describing at least one Extensible Firmware Interface (EFI) variable. The modified BIOS setting is stored in a future setting data structure in a baseboard management controller (BMC). A current setting data structure stored in the BMC is provided. At least a portion of the current setting data structure is replaced with the modified BIOS setting to provide a modified current setting data structure. The modified current setting data structure is applied to the computing system.

In an implementation, the future setting data structure and the current setting data structure are in JavaScript Object Notation (JSON) format. In an implementation, the method further includes determining whether a BIOS of the system is performing a first boot. An attribute registry is sent by the BIOS to the BMC, based at least in part on the determining that the BIOS is performing the first boot.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
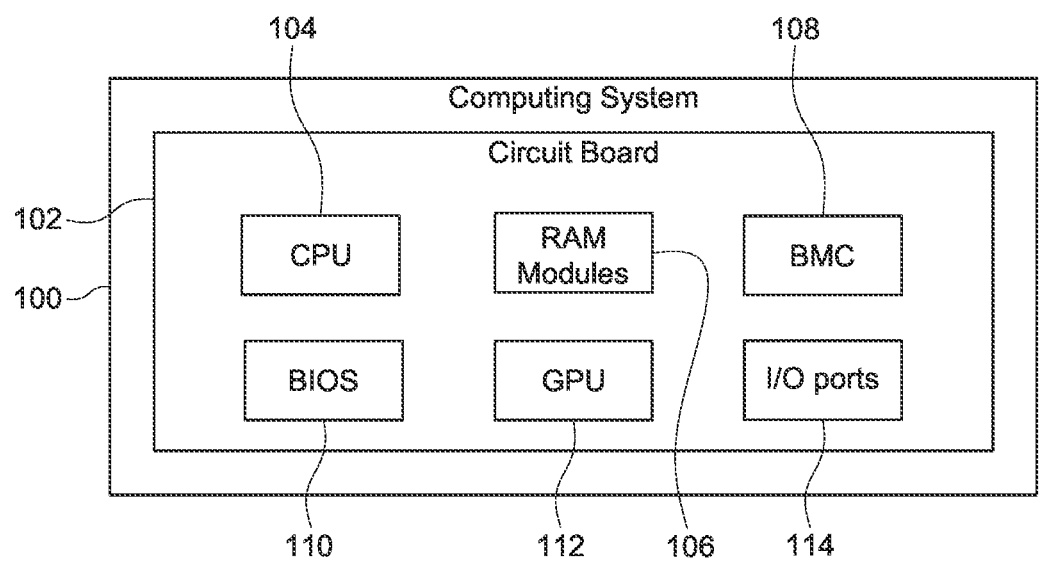
FIG. 1 is a block diagram of a computing system, according to certain aspects of the present disclosure.

In modern servers, storing basic input-output system (BIOS) settings can be beneficial for centralized management of boot settings. Stored BIOS settings can be changed, preserved, or ported from one computing device to another computing device. Currently, only general BIOS settings can be stored in modern servers. General BIOS settings are typically variables that can take on a binary value, for example, an enable or disable value. These general BIOS settings are static variables. These general BIOS settings can be stored in the BMC associated with the server. BIOS settings, however, involve setting variables other than general BIOS settings. For example, EFI variables may need to be set, preserved, or ported, but due to the dynamic nature of EFI variables, EFI variables are not stored in the BMC. Embodiments of the present disclosure provide a system and method for storing EFI variables in a similar manner as general BIOS settings. Embodiments of the present disclosure enhance computing systems and computing infrastructure by allowing the ability to port a more complete BIOS firmware, improving management of BIOS settings across a data center.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram of components of a computing system 100 is provided. The computing system 100 can be a server, but any suitable computer device can incorporate the principles disclosed herein. The computing system 100 includes a circuit board 102. The circuit board 102 can be one motherboard or multiple motherboards interconnected with one or more communication cables. Installed on the circuit board 102 is a CPU 104, a random access memory (RAM) module 106, a BMC 108, BIOS 110, a graphical processing unit (GPU) 112, and/or an input-output (I/O) port 114.

Although one of each of the components of the computing system 100 is shown in FIG. 1, the computing system 100 can support more than one of each of these components. For example, the CPU 104 can represent one or more CPUs (e.g., two CPUs, three CPUs, four CPUs, six CPUs, etc.). Similarly, the RAM module 106 can represent multiple RAM modules (e.g., multiple dual in-line memory modules (DIMMs), for example, two DIMMs, four DIMMs, eight DIMMs, etc.). The GPU 112 can be provided for specialized processor functionality. In some implementations, specialized functionality is provided by a field programmable gate array (FPGA) and/or a complex programmable logic device (CPLD) or an expansion card provided in the computing system 100.

The CPU 104 has access to the RAM module 106. The CPU 104 can be communicatively coupled to a platform controller hub or a chipset of the circuit board 102. The chipset of the circuit board 102 can provide access to communication standards such as serial advanced technology attachment (SATA) devices, peripheral component interconnect express (PCIe) devices, network interface cards (NICs), redundant array of inexpensive disks (RAID) cards, small computer system interface (SCSI) interface, FPGA cards, the GPU 112, etc.

In some implementations, the GPU 112 and/or video interfaces allow a monitor or screen to connect to the circuit board 102. Video processing and secondary memory access (e.g., the RAM module 106) typically require high speed operation and access to the CPU 104, hence can be connected to the CPU 104 without having to go through the chipset of the circuit board 102. In some implementations, the GPU 112 is a PCIe card or an accelerated graphics port (AGP) card. From a high level, the I/O port 114 represents any one of these interfaces for allowing input and/or output devices to interface with the computing system 100. For example, the I/O port 114 can represent a universal serial bus (USB) port that supports, for example, USB4, USB 3.2, USB 3.1, USB 3.0, USB 2.0, etc. The I/O port 114 can represent NIC ports that support wired interfaces such as Ethernet or wireless interfaces such as Bluetooth®, Wi-Fi, etc. The I/O port 114 can represent other ports such as HDMI ports, headphone jacks, external SATA (eSATA), etc. In some implementations, some ports within the I/O port 114 are coupled to the CPU 104 through the GPU 112. That is, the GPU 112 includes ports (e.g., USB-C ports, HDMI ports, etc.). In some implementations, some ports within the I/O port 114 go through the chipset of the circuit board 102 (e.g., Ethernet ports, headphone jacks, keyboard interfaces, mouse interfaces, parallel ports, serial ports, USB 3.0 ports, etc.).

The BIOS 110 represents a read only memory (ROM) or flash chip that is provided on the circuit board 102 that allows access and basic set up of the computing system 100. On startup of the computing system 100, the BIOS 110 includes instructions (or code) on how to load basic computer hardware (e.g., some of the components discussed above like the GPU 112, keyboard interface, mouse interface, etc.). The BIOS 110 includes a self-test that runs when the computing system 100 is powered on to ensure that the computing system 100 meets requirements for booting up properly. The self-test is referred to as the BIOS power-on self-test (POST). A series of beeps are typically provided when the computing system 100 fails the BIOS POST. The pattern of beeps can be indicative of which hardware component failed. The BIOS POST picks up any basic problems. For example, the BIOS POST can provide (a) a basic memory check (e.g., check that items can be written to and read from memory), (b) a basic storage check (e.g., check that hard drives start up and accept commands and/or spin up and allow access), (c) a basic check of input and output devices (e.g., check that there are no stuck keys on the keyboard or that at least one of a keyboard or mouse is connected), etc.

The BIOS 110 further includes code that allows finding partition(s) of one or more of the operating systems of the computing system 100. The BIOS 110 can order the operating systems based on BIOS settings. The BIOS 110 facilitates reading the bootloader from the partition and loading the operating system. Once the operating system is loaded, the BIOS 110 relinquishes control to the operating system. The BIOS settings can be updated if a flash BIOS, and these settings can ensure proper configuration of devices on starting up the computing system 100.

During firmware updates of the BIOS 110, BIOS settings can be lost. The code in the BIOS 110 can be updated for various reasons. In an example, the firmware updates of the BIOS 110 can include driver updates for better control of peripheral devices like mice and keyboards. The firmware updates of the BIOS can include adding additional functionality such as upgrading a text-based BIOS to a graphical user interface (GUI) based BIOS. Typically, when firmware updates are made to the BIOS 110, BIOS settings can be lost. Thus, the BMC 108 can be used to store general BIOS settings.

Figure 2:
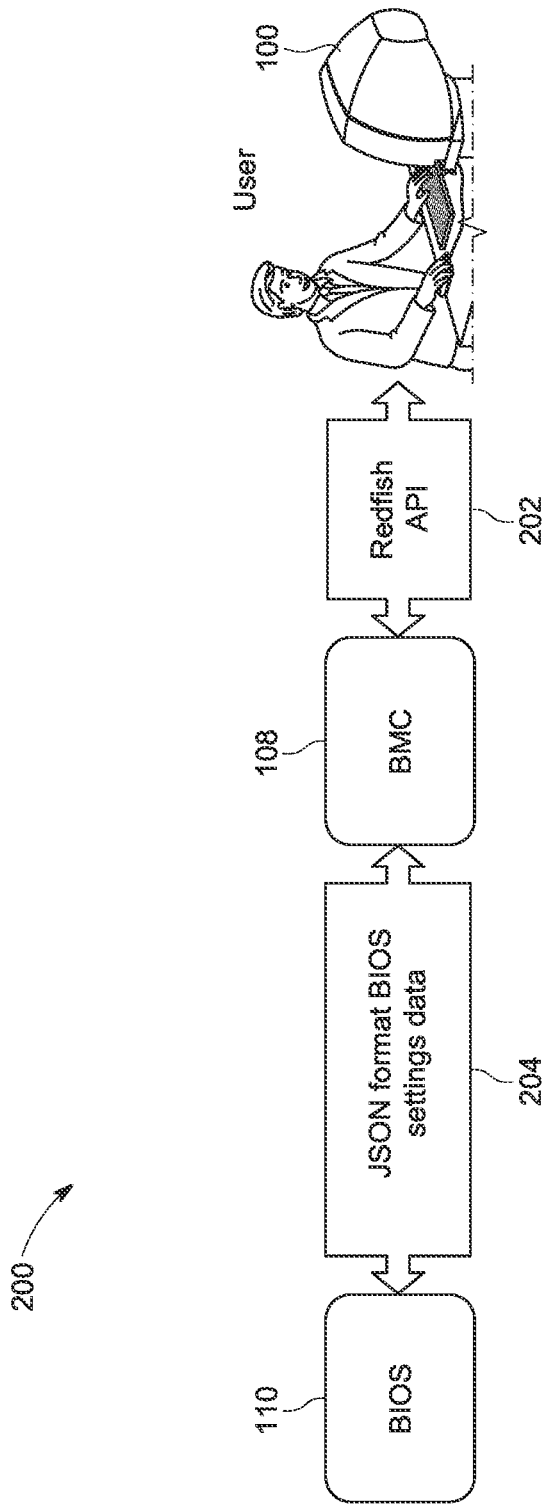
FIG. 2 is a flow diagram illustrating steps for storing boot settings, according to certain aspects of the present disclosure.

Referring to FIG. 2, a flow diagram illustrating a process 200 for storing BIOS settings is provided, according to certain aspects of the present disclosure. A user of the computing system 100 can use an application user interface (API), for example, Redfish API 202, to view and control BIOS settings stored on the BMC 108. In some implementations, the BIOS settings are stored in JavaScript Object Notation (JSON) format so that the Redfish API 202 can be used by the user of the computing system 100 to control BIOS settings or be used to port the BIOS settings from the computing system 100 to another computing system (not shown). The BMC 108 is used here as an example, but other locations available on startup can be used to store the BIOS settings. The BMC 108 here is beneficial due to the BMC 108 supporting the Redfish API 202. In some implementations, other storage locations including a remote server that supports Redfish can store the BIOS settings and can be accessed via network. That is, the remote server can perform one or more functions similar to that of the BMC 108 (e.g., storing BIOS settings of computing system 100 and providing Redfish API for the user to change the BIOS settings stored).

General BIOS settings are not the only types of BIOS settings that may benefit from being stored at the BMC 108. Embodiments of the present disclosure allow storing other types of BIOS settings, which may have varied value length or which may change from one boot session to another. These types of BIOS settings are currently not stored in the BMC of modern servers because their value lengths are typically dynamically determined on startup. For example, UEFI secure boot settings include several databases for storing certificates/signatures, and the total number of certificates/signatures stored may vary. Thus, the value length for storing UEFI secure boot settings is not static. In another example, settings for boot order of the bootable devices (e.g., solid state disk, DVDROM, PXE, etc.) are not static because the number of bootable devices may vary depending on actual devices installed in the computing system 100. In another example, TLS certificate used for HTTPs boot is not static because the number of CA certificates enrolled in the BIOS 110 for verifying HTTPs boot servers may vary. In another example, network iSCSI and VLAN settings is not static because each network port can have its own settings, so that the value length corresponding to the total number of ports will be dependent on the number of network ports in the computing system 100.

Thus, for handling these dynamic BIOS settings in the BMC 110, the original schema used for describing general BIOS settings, which have fixed value length, cannot be used, and specific schemas need to be designed for each kind of dynamic BIOS settings. For example, a specific schema is required for describing the database storing the certificates and signatures used in UEFI Secure Boot while another specific schema is required for describing iSCSI and VLAN setting of each network port. This process can be inefficient, thus some implementations of the present disclosure provide systems and methods for using the original schema used for describing general BIOS settings to handle complex dynamic BIOS settings. These systems and methods involve using EFI variables, without the need of designing multiple kinds of specific schemas for different kinds of dynamic variables.

The process 200 can be adapted to store, not only general BIOS settings, but also dynamic BIOS settings. Dynamic BIOS settings are typically represented in EFI variables and have a different format than general BIOS settings. In a data center, modern servers currently extract general BIOS settings from UEFI human interface infrastructure (HII) database and transfer the general BIOS settings as JSON format 204 for storage in the BMC 108. The UEFI HII database is typically located in the RAM modules 106 (e.g., DRAM) of the computing system 100. The UEFI HII is created in the RAM modules 106 and used by the BIOS 110 during each BIOS boot up for displaying a BIOS setup menu to the user. Since the HII database includes data from the BIOS setting, the HII is also used by the BIOS 110 for creating JSON format BIOS settings to be used in Redfish API 202. Values or content stored in EFI variables is not directly stored in the HII database. Furthermore, the content of EFI variables is typically binary content that cannot be directly used in JSON format. Embodiments of the present disclosure provide a system and method to handle EFI variables. The process 200 can be used to transfer contents of EFI variables as strings which can be combined with general BIOS settings in JSON format and stored in the BMC 108. By being able to store EFI variables in the BMC 108, the user of the computing system 100 can preserve, change, or port EFI variables using Redfish API 202 in a similar manner as general BIOS settings.

General BIOS settings can be stored by the BMC 108 in three kinds of JSON format data structures for use in Redfish API 202. These three kinds of JSON format data structures are an attribute registry data structure, a current setting data structure, and a future setting data structure.

An attribute registry data structure stores each option or value that a key can hold. For example, an attribute registry example is provided below.

Attribute Registry Example

```
{
    "AttributeName": "SELS015",
    "DefaultValue": "Enable",
    "DisplayName": "PCIE Corrected Error Threshold Counter",
    "HelpText": "Enable/Disable PCIE Corrected Error Counter",
    "ReadOnly": false,
    "ResetRequired": true,
    "Type": "Enumeration",
```

Attribute Registry Example -continued

```
    "UefiNamespaceId": "x-UEFI",
    "Value": [
        {
            "ValueDisplayName": "Disable",
            "ValueName": "Disable"
        },
        {
            "ValueDisplayName": "Enable",
            "ValueName": "Enable"
        }
    ]
}
```

The attribute registry example above includes key-value pairs. The attribute name key "AttributeName" identifies the attribute being set, and in this example, the attribute being set is SELS015. The attribute can have a default value (i.e., "DefaultValue" key) set to "Enable." The attribute can have a display name (i.e., "DisplayName") that provides a human-identifiable name for the attribute, rather than a mere variable name provided by the "AttributeName" key. The attribute can have a human-readable description (i.e., "HelpText") that provides more information on the attribute. In some implementations, a "ReadOnly" key and/or a "ResetRequired" key can be set with Boolean values of true or false to further customize the attribute. The attribute can have an associated "Type" and/or "UefiNamespaceId" keys. Although the default value is set, the different values that the attribute can take can be defined under the "Value" key. In this example, the "Value" key can be "Enable" or "Disable."

A current setting data structure stores current BIOS setting values currently used by the computing system 100. For example, an attribute SELS015 can be set to "Enable." An example of a current setting data structure is provided below:

Current Setting Example

```
{
    ...
    "SELS015": "Enable",
    "SELS016": 10,
    "SETUP003": 5,
    "SETUP005": false,
    ...
}
```

The current setting data structure has a list that pairs attribute names with values. In the example above, the attribute identified by "AttributeName" SELS015 takes on a "Value" of "Enable", the attribute identified by "AttributeName" SELS016 takes on a "Value" of 10, the attribute identified by "AttributeName" SETUP003 takes on a "Value" of 5, and the attribute identified by "AttributeName" SETUP005 takes on a "Value" of false. Each of the attributes identified in the current setting data structure will have a corresponding definition in the attribute registry data structure. The attribute registry data structure example provided above is only an example of the definition of SELS015.

The future setting data structure, similar to the current setting data structure, includes a pair of attribute name and one or more values. The difference between the future setting data structure and the current setting data structure is in how both are used. The current setting describes current values being used on the system, while the future setting describes future values to be applied when the computing system 100 is reset or when the computing system 100 powers on. Furthermore, the user of the computing system 100 is unable to modify the current setting and can only modify the future setting.

Figure 3:
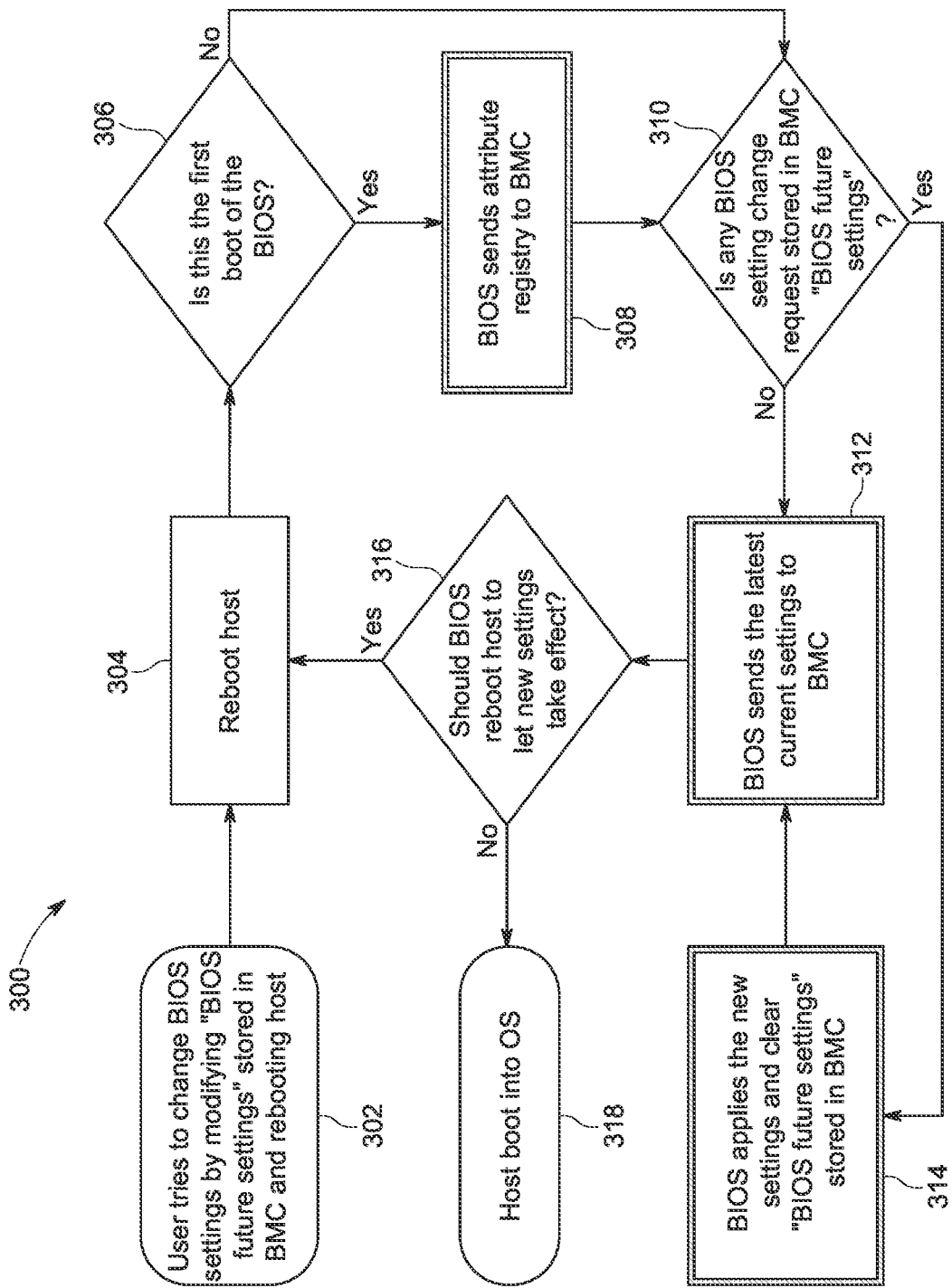
FIG. 3 is a flow diagram illustrating steps for applying boot settings in a computing environment, according to certain aspects of the present disclosure.

Referring to FIG. 3, a flow diagram illustrating a process 300 for applying boot settings to a computing system (e.g., the computing system 100) is provided, according to certain aspects of the present disclosure. At step 302, the user of the computing system 100 (FIG. 2) makes changes to the BIOS settings, and the modified BIOS settings are stored in the BMC 108 (FIG. 2) using the Redfish API 202 (FIG. 2). The modified BIOS settings are stored in the future setting data structure on the BMC 108, and a signal is provided to reboot the host (e.g., the computing system 100) at step 304. Step 302 is performed by the BMC 108, while step 304 can be performed by any component that can reboot the computing system 100 (i.e., the host system). Components that can reboot the computing system include the BMC 108, the BIOS 110, an operating system running on the CPU 104, etc.

At step 306, during the computing system 100 boot up, the BIOS 110 determines whether the current signal for booting of the computing system 100 (step 304) is the first boot of the BIOS 110 (FIG. 2) since last BIOS update. If this is the first boot of the BIOS 110, then the BIOS 110 sends its attribute registry to the BMC 108 at step 308. If this is not the first boot of the BIOS 110, then step 308 is skipped, and step 310 is performed. The attribute registry is only sent as needed because the attribute registry is a large file, and sending the registry every time can slow down the boot process.

At step 310, the BIOS 110 retrieves the future setting data structure stored in the BMC 108 and determines whether there are any modified BIOS settings contained within the future setting data structure. If there are modified BIOS settings in the future setting data structure, then at step 314, the BIOS 110 applies the modified BIOS settings to BIOS settings stored in the BIOS 110 (i.e., the flash chip or other physical memory that contains the BIOS). The BIOS 110 then clears the future setting data structure from the BMC 108. If there are no modified BIOS settings at step 310, then at step 312, the BIOS 110 sends the current setting data structure to the BMC 108.

At step 316, the BIOS 110 determines whether a reboot is required for the settings stored in the current settings data structure of step 312 to take effect. If a reboot is not required, then at step 318, the BIOS 110 proceeds to allow the computing system 100 to boot into the operating system. If a reboot is required, then at step 304, a reboot is performed by the BIOS 110.

Figure 4:
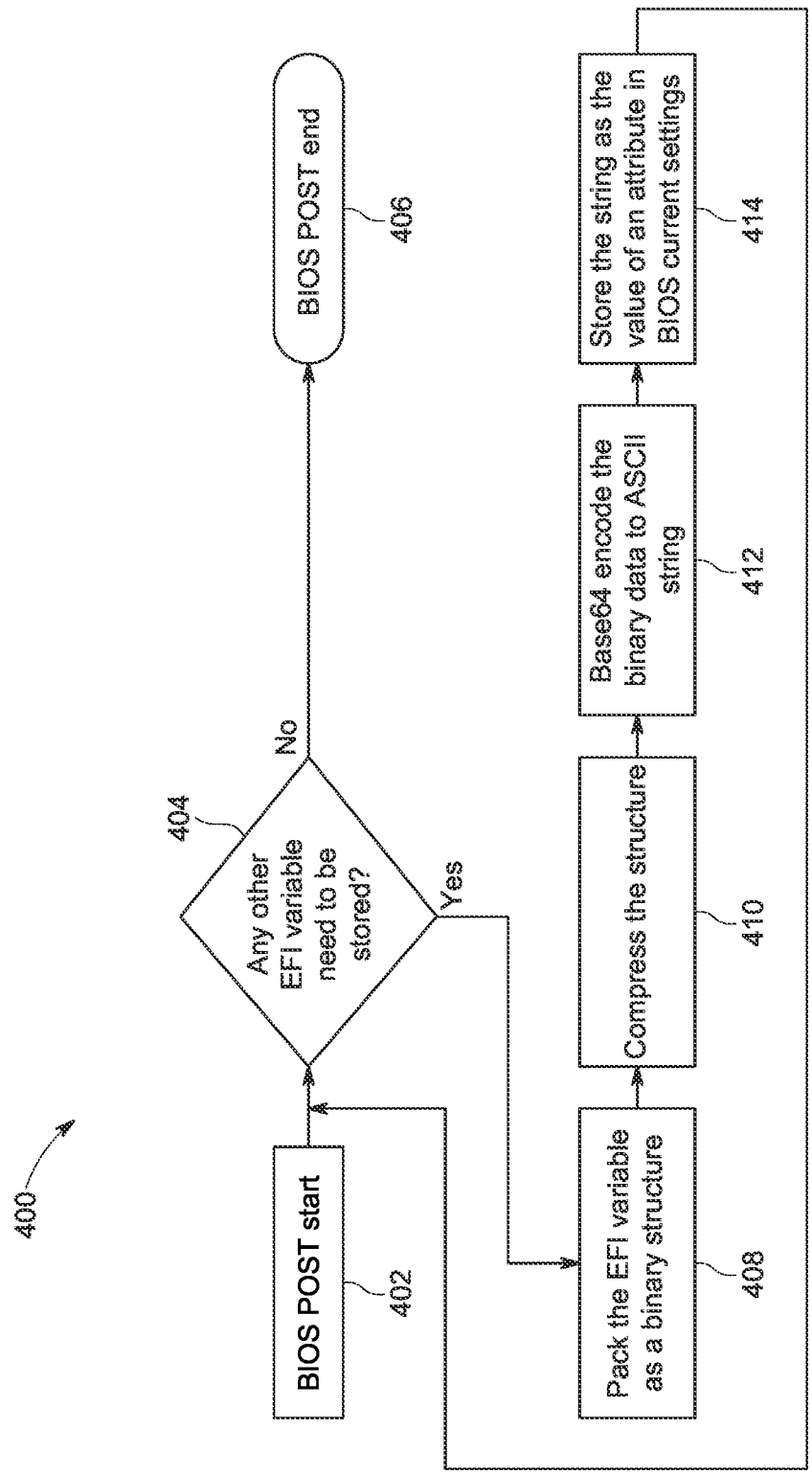
FIG. 4 is a first flow diagram illustrating steps performed during a BIOS POST, according to certain aspects of the present disclosure.

Referring to FIG. 4, a flow diagram illustrating a process 400 for storing EFI variables to the current setting data structure during a BIOS POST is provided, according to certain aspects of the present disclosure. In some implementations, all steps in FIG. 4 are performed by the BIOS 110.

At step 402, the BIOS POST begins. At step 404, the BIOS 110 determines whether any EFI variable needs to be stored in the current setting data structure. If no EFI variables need to be stored, then the BIOS POST ends at step 406.

If an EFI variable needs to be stored, then at step 408, the BIOS 110 packs the EFI variable that needs to be stored as a binary structure. The binary structure can include the EFI variable name (or attribute name), globally unique identifier (GUID), values associated with the EFI variable, data size, etc. An example of an attribute registry entry for an EFI variable is provided below.

| Attribute Registry Example for an EFI Variable |
| --- |
| {<br>   "AttributeName": "OEMVAR_ISCSI00",<br>   "DisplayName": "OEMVAR_ISCSI00",<br>   "MaxLength": 65535,<br>   "MinLength": 0,<br>   "ReadOnly": false,<br>   "Type": "String"<br>}, ... |

The attribute registry entry for the EFI variable includes an attribute name, a display name, a type, a minimum length for the value parameter, and a maximum length for the value parameter. No default value parameter is provided in the EFI variable since the EFI variable values are dynamic. The type parameter is indicated as "String" for storing a string, which will be transferred from the binary structure of the EFI variable.

At step 410, optionally, the binary structure of step 408 is compressed. Any algorithm for compressing binary data can be used. In some implementations, a suggested method described in UEFI specification is used, that is, a combination of the LZ77 algorithm and Huffman Coding. Since described in the UEFI specification, usually, a UEFI BIOS already includes libraries that can be used for compression and decompression.

At step 412, the binary structure is encoded to an American Standard Code for Information Interchange (ASCII) string. In some implementations, a Base64 algorithm is used to encode the binary structure to the ASCII string. At step 414, the ASCII string is stored as the value for the attribute corresponding to the EFI variable in the current setting data structure. An example of an entry in the current setting data structure for the "OEMVAR_ISCSI00" attribute is provided below.

| Current Setting Example for an EFI Variable |
| --- |
| {<br>  ...<br>  "OEMVAR_ISCSI00".<br>  "V1QgAAAGAAAAAAOEtR2qUS+plnhJCQSmuzAO1VZ3gbjl/Rc4CSbiBqclhkaG5oosbHB2nkXKqt1zuRwxdk+GcfZzWWx18rHn/WAAA=",<br>  ...<br>}, |

Figure 5:
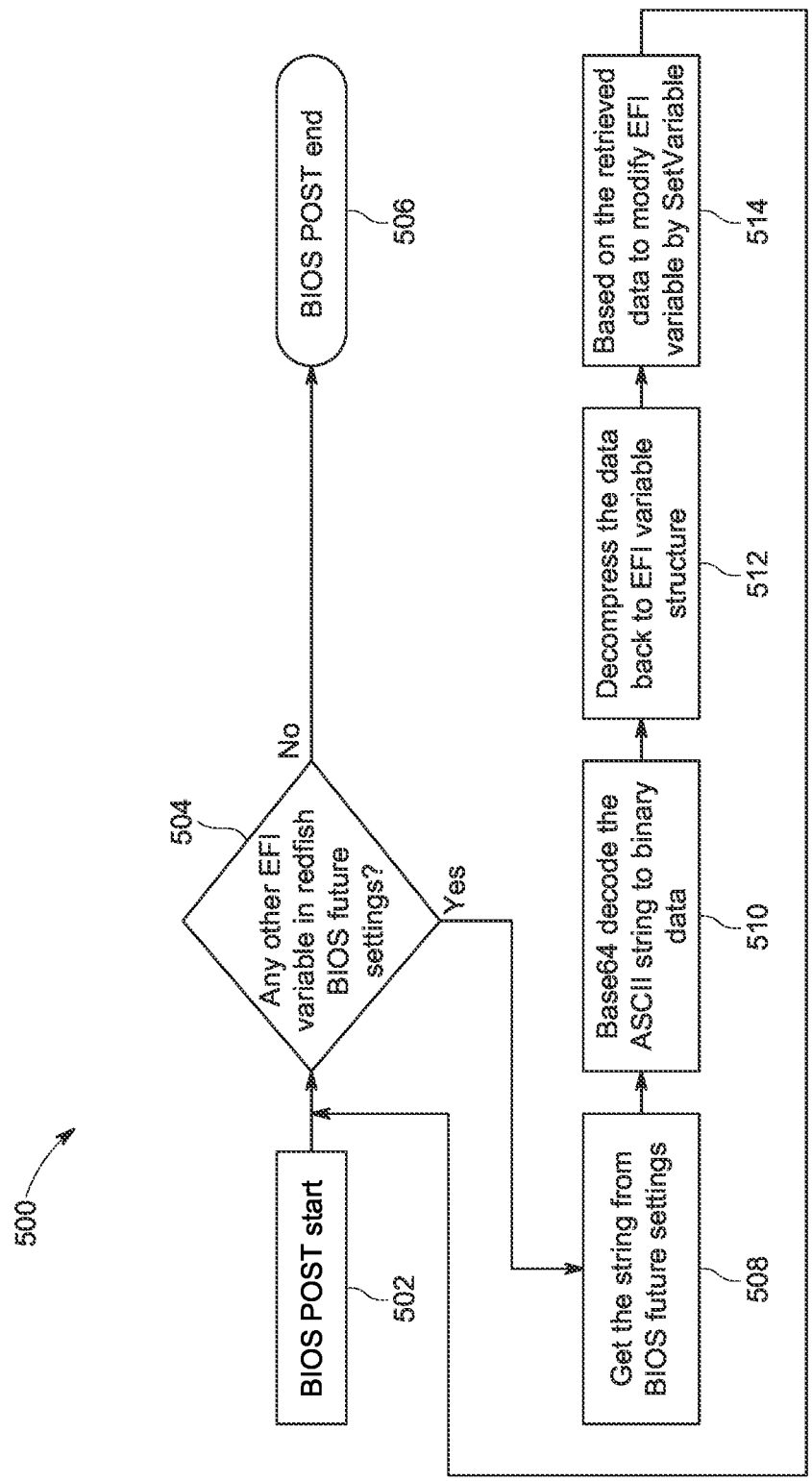
FIG. 5 is a second flow diagram illustrating steps performed during a BIOS POST, according to certain aspects of the present disclosure.

Referring to FIG. 5, a flow diagram illustrating a process 500 for extracting EFI variables from the future setting data structure during a BIOS POST is provided, according to certain aspects of the present disclosure. In some implementations, all steps in FIG. 5 are performed by the BIOS 110. At step 502, the BIOS POST begins. At step 504, the BIOS 110 determines whether any EFI variable from the future setting data structure needs to be set in the current setting data structure. If no EFI variables need to be set, then the BIOS POST ends at step 506.

If an EFI variable needs to be set, then at step 508, the BIOS 110 obtains an ASCII string corresponding to the EFI variable from the future setting data structure. At step 510, the BIOS 110 decodes the ASCII string to obtain a binary structure. The decode algorithm can be a Base64 decode algorithm.

Optionally, at step 512, the BIOS 110 decompresses the binary structure back to an EFI variable structure.

At step 514, based on the ASCII string that has been decompressed, the BIOS 110 modifies the EFI variable using the SetVariable UEFI BIOS service function. The binary structure obtained at step 510 is used to confirm whether or not the binary structure is applicable into BIOS flash as an EFI variable. If this confirmation process is successful, then the EFI variable is modified using the SetVariable function.

By being able to display values or content of EFI variables in the three kinds of JSON data formats, the user of the computing system 100, a user management software of the computing system 100, or the BMC 108 can change, preserve, or port EFI variables via Redfish API 202. Contents of the EFI variable can be changed when the user, the management software, or the BMC 108 modifies values in the future setting data structure using the Redfish API 202. The BMC 108 can preserve values of EFI variables stored in the current setting data structure in the BMC 108 when updating firmware of the BIOS 110. The values of the EFI variables can then be placed in the future setting data structure in order to provide the updated BIOS 110 with the original values of the EFI variables. Without performing these operations, contents of the EFI variables would be cleared and lost during BIOS firmware update due to erasure of the BIOS 110 during the firmware update of the BIOS 110.

In some implementations, the user or the management software can copy (or port) contents of the EFI variable from one computing system to another. By copying the current setting data structure from the source system and pasting it to the target system's future setting data structure via the Redfish API 202, the contents of the EFI variable can be ported.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A system, comprising:
one or more data processors; and
a non-transitory computer-readable storage medium containing instructions which, when executed on the one or more data processors, cause the one or more data processors to perform operations including:
receiving a modified basic input-output system (BIOS) setting using an application programming interface (API), the modified BIOS setting including an attribute describing at least one Extensible Firmware Interface (EFI) variable,
storing the modified BIOS setting in a future setting data structure in a baseboard management controller (BMC),
determining whether a BIOS of the system is performing a first boot,
sending, by the BIOS to the BMC, an attribute registry, based at least in part on the determining that the BIOS is performing the first boot,
replacing at least a portion of a current setting data structure stored in the BIOS with the modified BIOS setting to provide a modified current setting data structure, and
applying the modified current setting data structure to the system.

2. The system of claim 1, wherein the EFI variable describes attributes of an Internet Small Computer System Interface (iSCSI) device, a unified EFI (UEFI) Secure Boot setting, a boot order of bootable devices, TLS certificates, and/or network VLAN settings.

3. The system of claim 1, wherein the attribute registry includes a definition of the attribute describing the at least one EFI variable.

4. The system of claim 3, wherein a type key of the attribute describing the at least one EFI variable is a string.

5. The system of claim 3, wherein the definition of the attribute describing the at least one EFI variable does not include a default value parameter and a definition of an attribute describing a general BIOS setting includes a default value parameter.

6. The system of claim 1, wherein the API is a Redfish API.

7. The system of claim 1, wherein the future setting data structure and the current setting data structure are in JavaScript Object Notation (JSON) format.

8. The system of claim 1, wherein executing the instructions further causes the one or more data processors to perform operations including:
storing the EFI variable to the current setting data structure.

9. The system of claim 8, wherein the storing the EFI variable to the current setting data structure includes:
packing the EFI variable as a binary structure;
encoding the binary structure to a string; and
storing, in the current setting data structure, the string as a value of the attribute.

10. The system of claim 9, wherein the storing the EFI variable to the current setting data structure further includes:
compressing the binary structure prior to encoding the binary structure.

11. The system of claim 9, wherein the binary structure is encoded using Base64.

12. The system of claim 1, wherein the replacing of at least a portion of the current setting data structure with the modified BIOS setting includes:

receiving a string from the future setting data structure, the string being a value of the attribute;

decoding the string to a binary structure;

confirming the binary data structure is applicable into the BIOS as an EFI variable; and replacing at least a portion of the current setting data structure with the string in the future setting data structure based on the binary data structure being applicable into the BIOS as an EFI variable.

13. The system of claim 12, wherein the replacing of at least a portion of the current setting data structure with the modified BIOS setting further includes:

decompressing the binary structure after decoding the string.

14. The system of claim 1, wherein the system is a data center including at least one server.

15. The system of claim 14, wherein any one of the current setting data structure, the future setting data structure, or an attribute registry is generated from a UEFI human interface infrastructure (HII) database of the BIOS.

16. The system of claim 14, wherein the at least one server includes a first server and a second server, and wherein executing the instructions further cause the one or more data processors to perform operations including:

porting a current setting data structure of the first server and an associated attribute registry of the first server to the second server.

17. A method performed by a computing system, the method comprising:

receiving a modified basic input-output system (BIOS) setting using an application programming interface (API), the modified BIOS setting including an attribute describing at least one Extensible Firmware Interface (EFI) variable;

storing the modified BIOS setting in a future setting data structure in a baseboard management controller (BMC);

determining whether a BIOS of the system is performing a first boot;

sending, by the BIOS to the BMC, an attribute registry, based at least in part on the determining that the BIOS is performing the first boot;

replacing at least a portion of a current setting data structure stored in the BIOS with the modified BIOS setting to provide a modified current setting data structure; and applying the modified current setting data structure to the computing system.

18. The method of claim 17, wherein the future setting data structure and the current setting data structure are in JavaScript Object Notation (JSON) format.

19. A system, comprising:

one or more data processors; and a non-transitory computer-readable storage medium containing instructions which, when executed on the one or more data processors, cause the one or more data processors to perform operations including:

receiving a modified basic input-output system (BIOS) setting using an application programming interface (API), the modified BIOS setting including an attribute describing at least one Extensible Firmware Interface (EFI) variable, storing the modified BIOS setting in a future setting data structure in a baseboard management controller (BMC), replacing at least a portion of a current setting data structure stored in the BIOS with the modified BIOS setting to provide a modified current setting data structure by:

receiving a string from the future setting data structure, the string being a value of the attribute, decoding the string to a binary structure, confirming the binary data structure is applicable into the BIOS as an EFI variable, and replacing at least a portion of the current setting data structure with the string in the future setting data structure based on the binary data structure being applicable into the BIOS as an EFI variable, and applying the modified current setting data structure to the system.

20. A method performed by a computing system, the method comprising:

receiving a modified basic input-output system (BIOS) setting using an application programming interface (API), the modified BIOS setting including an attribute describing at least one Extensible Firmware Interface (EFI) variable;

storing the modified BIOS setting in a future setting data structure in a baseboard management controller (BMC);

replacing at least a portion of a current setting data structure stored in the BIOS with the modified BIOS setting to provide a modified current setting data structure by:

receiving a string from the future setting data structure, the string being a value of the attribute, decoding the string to a binary structure, confirming the binary data structure is applicable into the BIOS as an EFI variable, and replacing at least a portion of the current setting data structure with the string in the future setting data structure based on the binary data structure being applicable into the BIOS as an EFI variable; and applying the modified current setting data structure to the computing system.

* * * * *